C. McL. MOSS.
PROTECTIVE APPARATUS FOR DYNAMO ELECTRIC MACHINES.
APPLICATION FILED JUNE 29, 1918. RENEWED NOV. 23, 1920.

1,392,198.   Patented Sept. 27, 1921.

WITNESSES:
H.B.Funk
a.a.Brand

INVENTOR
Charles McL. Moss.
BY
Wesley G. Carr
ATTORNEY

UNITED STATES PATENT OFFICE.

CHARLES McL. MOSS, OF PITTSBURGH, PENNSYLVANIA, ASSIGNOR TO WESTINGHOUSE ELECTRIC AND MANUFACTURING COMPANY, A CORPORATION OF PENNSYLVANIA.

PROTECTIVE APPARATUS FOR DYNAMO-ELECTRIC MACHINES.

1,392,198.      Specification of Letters Patent.      Patented Sept. 27, 1921.

Application filed June 29, 1918, Serial No. 242,623. Renewed November 23, 1920. Serial No. 426,106.

*To all whom it may concern:*

Be it known that I, CHARLES McL. Moss, a citizen of the United States, and a resident of Pittsburgh, in the county of Allegheny and State of Pennsylvania, have invented a new and useful Improvement in Protective Apparatus for Dynamo-Electric Machines, of which the following is a specification.

My invention relates to means for reducing commutator flashing, and it has for its object to provide apparatus of the character designated which will operate upon the occurrence of any abnormal conditions which may give rise to commutator flashing, whether these conditions arise within or without the machine to be protected.

In a copending application of N. W. Storer, Serial No. 203,527, filed Nov. 23, 1917 and assigned to the Westinghouse Electric & Manufacturing Company are illustrated means for protecting direct-current machines against flash-overs which may be occasioned by an abnormal rise of current in the load circuit supplied by said machine.

However, it may, at times, become necessary to provide means for protecting machines of the above character from flash-overs which may be initiated by conditions which arise within the machine, or between the machine and the means above set forth for protecting said machine from a flash-over due to overload-current conditions.

I propose, therefore, to supply protective means which shall be actuated by any change occurring in the field flux of said machine, providing said change in field flux is of sufficient rapidity to be distinguished from the normal changes which may be occasioned by the starting, stopping or voltage adjustment of said machine. To this end, I provide relay mechanisms which are so associated with the field winding of a machine that, upon the initiation of conditions which will ultimately result in a flash-over, they will actuate means to inter-connect points of differing potential in the armature winding of the direct current machine to be protected, and will thereby cause the magnetically stored energy to be dissipated in heat, rather than in the impending flashover.

For a better understanding of my invention, reference may be had to the drawings in which:—

Figure 1:
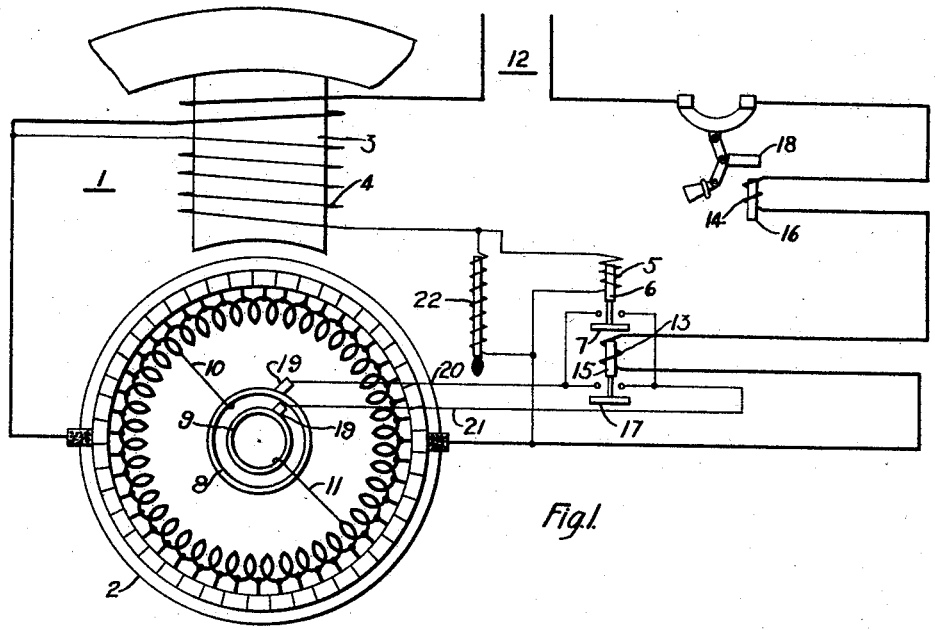
Figure 2:
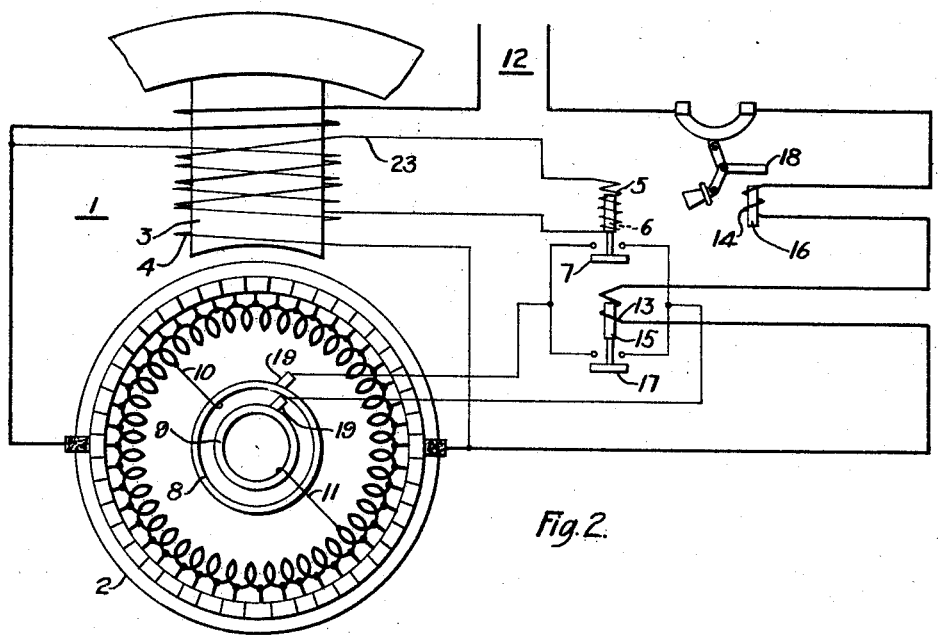

Figure 1 is a diagrammatic view of one form of my invention, while Fig. 2 is a view of a modification thereof.

Referring more specifically to Fig. 1, a direct-current machine 1 is shown, provided with an armature 2, and with a field-magnet pole-piece 3 upon which is wound a field winding 4, said field winding being connected in series relation with a trip coil 5 which is positioned to actuate a plunger 6 connected to a circuit-closing member 7. Mounted upon the armature 2 are slip rings 8 and 9 which are connected, by leads 10 and 11, respectively, to armature points of differing potential. A load circuit 12 is fed from the armature of the direct-current machine through a commutator of usual type.

The load circuit 12 is connected in series-circuit relationship with coils 13 and 14 which are adapted to actuate plungers 15 and 16, respectively, these plungers 15 and 16 serving to operate a circuit-closing member 17 and to trip a circuit-breaker 18, respectively. It will be observed that the energization of either of the coils 5 and 13 and the resulting actuation of either of the circuit-closing members 7 and 17 will provide an interconnection between the oppositely connected armature points through the medium of the slip rings 8 and 9 and brushes 19—19 connected to leads 20 and 21.

Connected in shunt relationship to the coils 5 may be an adjustable inductive device 22, said device being employed for a purpose which will be hereinafter set forth.

In considering the operation of the above-described apparatus, assume that an abnormal condition tending to produce a flash-over arises between the point where the overload breaker 18 would normally open the circuit and the armature itself. Such an abnormal condition will result in a large increase in the demagnetizing force, and this force will, in turn, cut down, with great rapidity, the normal field flux. Such a sudden change of the flux threading the field winding 4 will result in an increased current of very steep wave front being forced through said field winding and its associated trip coil 5. Upon such abnormal occurrence, therefore, the coil 5 operates to actuate the circuit-closing member 7, and the energy which gave rise to the increased current through the field winding is dissipated through the short-circuited armature by reason of the ohmic resistance thereof to the flow therethrough of the heavy current which said flux change induces therein.

However, should the abnormal occurrence be in the nature of an overload in the circuit 12, the short-circuiting of the armature would be accomplished through the medium of the coil 13 and the circuit-closing member 17. Since, however, this feature is specifically described and claimed in the above mentioned copending application, a further description will not here be given.

While I have shown the dynamo-electric machine described herein as provided with both of the above protective coils, namely, the one energized through the medium of the field winding, and the other, by the overload current flowing therethrough, it will be understood that the coil 5 and its associated circuit-closing member 7 alone may be used and that the machine will be adequately protected thereby, since an external overload will be instrumental in operating the member 7 in the same manner as above described in connection with abnormal conditions tending to promote a flash-over and arising between the machine and the breaker 18, although, under these conditions, a slightly longer time interval will elapse before the conditions tending to cause a flashover are relieved.

The adjustable inductance device 22 will provide a low-reactance path for currents of the comparatively flat wave front which would normally flow through the field winding 4 on account of the ordinary change of flux occasioned by the starting, stopping or voltage adjustment of said machine. When, however, a current of steep wave front tends to flow, such a current, for instance, as will traverse said field winding upon the occurrence of an abnormally rapid change in field flux, a very high reactance will be offered to such flow of current by the inductive device and, the resulting diversion of the current through coil 5, will result in a more positive actuation of the member 7, and the consequent interconnection of the armature tap points.

In Fig. 2 a modification of my flash-suppressing apparatus is shown in which the relay energizing force is derived from a short-circuited field coil 23 wound upon the same magnetic circuit as the main field winding. It will be observed that the operation of the device, as set forth in this figure, is substantially the same as described in connection with Fig. 1, with the exception that no inductive shunt is needed to prevent the normally-changing flux of the field magnet from operating the desired relay device.

It will be observed that, by the use of a device constructed in accordance with my invention, I am able to largely suppress flashovers which may tend to occur upon commutating machines and, at the same time, to restore circuit conditions to normal upon the subsidence of the abnormal conditions which gave rise to said flashover tendency.

While I have herein described and claimed this restoration of normal circuit conditions as accomplished by the automatic operation of the circuit-closing member, it is obvious that the relay may be re-set manually, if desired, and furthermore I wish it to be understood that the method herein shown of suppressing flashovers is equally applicable to other machines which are subject to such conditions.

I have shown and described two modifications of my invention but it is obvious that I desire only such limitations to be placed thereupon as may be imposed by the prior art or by the scope of the appended claims.

I claim as my invention:

1. The combination with a dynamo-electric machine of the commutator type, of means for interconnecting a plurality of points of different potentials in the armature winding thereof, upon an abnormal change in the field flux of said dynamo-electric machine.

2. The combination with a dynamo-electric machine of the commutator type, of means influenced by a change of the field flux of said machine, and means associated therewith for interconnecting a plurality of points of different potential in the armature winding of said machine.

3. The combination with a direct-current generator, comprising main field windings and an armature operatively associated therewith, of slip rings mounted upon said armature and connected to points of differing potential in the armature winding and means for interconnecting said slip rings upon an abnormal change in the field flux of said dynamo-electric machine.

4. The combination with a direct-current generator, comprising main field windings and an armature operatively associated therewith, of slip rings mounted upon said armature and connected to points of different potential in the armature winding, a relay device actuated in accordance with a change in the field flux of said machine, and means whereby said relay device interconnects said slip rings upon said change in field flux.

5. The combination with a dynamo-electric machine of the commutator type, of means for interconnecting a plurality of points of different potential in the armature winding thereof upon an abnormally abrupt change in the field flux of said dynamo-electric machine and for thereafter disconnecting said armature points upon the subsidence of the conditions giving rise to said abnormal change of field flux.

6. The combination with a direct-current generator, comprising main field windings and an armature operatively associated therewith, of slip rings mounted upon said armature and connected to points of different potential in the armature winding, a relay device actuated in accordance with a change in field flux of said machine, and means whereby said relay device interconnects said slip rings upon said change in field flux and thereafter disconnects said armature points upon the subsidence of the conditions giving rise to said change of field flux.

7. The combination with a dynamo-electric machine of the commutator type and comprising field windings and an armature operatively associated therewith, of means for interconnecting a plurality of points of different potentials in the armature winding thereof upon an abnormal change in the field flux of said dynamo-electric machine, said means being responsive to only an abnormal change of the field flux in said dynamo-electric machine.

8. The combination with a dynamo-electric machine of the commutator type comprising field windings and an armature operatively associated therewith, of means for interconnecting a plurality of points of different potential in the armature winding thereof upon an abnormal change in the field flux of said dynamo-electric machine, and means for preventing said first means from so interconnecting said armature points except when the abnormal change in flux is extremely rapid.

9. The combination with a dynamo-electric machine of the commutator type comprising field windings and an armature operatively associated therewith, of means for interconnecting a plurality of points of different potential in the armature winding thereof upon an abnormal change in the field flux of said dynamo-electric machine, and means, comprising a variable inductance, for preventing said first means from so interconnecting said armature points except when the abnormal change in flux is extremely rapid.

10. The combination with a dynamo-electric machine comprising main field windings and an armature operatively associated therewith, of slip rings mounted upon said armature and connected to points of different potential in the armature winding, a relay device actuated in accordance with a change in field flux of said machine, and means whereby said relay device interconnects said slip rings upon said change in field flux and thereafter disconnects said armature points upon the subsidence of the conditions giving rise to said change of field flux, said relay, however, being operable upon an extremely rapid change of field flux only.

11. The combination with a dynamo-electric machine comprising a field flux circuit, an armature winding operatively associated therewith, of slip rings mounted upon said armature and connected to points of differing potential on said armature, and means interconnecting said slip rings, said means comprising a coil wound upon the field-flux circuit and a relay adapted to be energized thereby upon an abnormal change of the flux in said field-flux circuit.

12. The combination with a dynamo-electric machine of the type having a commutator and a field flux which is not subject to rapid variations in normal service, of means threaded by said field flux for automatically reducing the tendency for flashing at the commutator upon the occurrence of an abnormal change in flux.

13. The combination with a dynamo-electric machine of the type having a commutator and a field flux which is not subject to rapid variations in normal service, of means threaded by said field flux for automatically reducing the flux threading the armature conductors undergoing commutation upon the occurrence of an abnormal change in flux.

14. The combination with a dynamo-electric machine of the type having a commutator and a field flux which is not subject to rapid variations in normal service, of means influenced by an abnormal change in field flux for automatically interconnecting points of different potential in the armature winding.

15. The combination with a dynamo-electric machine of the type having a commutator and a field flux which is not subject to rapid variations in normal service, of means threaded by said field flux for automatically screening the field flux from the armature conductors undergoing commutation upon the occurrence of an abnormal change in flux.

In testimony whereof, I have hereunto subscribed my name this 26th day of June, 1918.

CHARLES McL. MOSS.